United States Patent
Kim et al.

(10) Patent No.: US 12,151,748 B2
(45) Date of Patent: Nov. 26, 2024

(54) STEER-BY-WIRE STEERING APPARATUS

(71) Applicant: HL MANDO CORPORATION, Pyeongtaek (KR)

(72) Inventors: Jeong Rae Kim, Seoul (KR); Eul Go Jung, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 17/769,345

(22) PCT Filed: Oct. 21, 2020

(86) PCT No.: PCT/KR2020/014437
§ 371 (c)(1),
(2) Date: Apr. 15, 2022

(87) PCT Pub. No.: WO2021/085928
PCT Pub. Date: May 6, 2021

(65) Prior Publication Data
US 2024/0140520 A1 May 2, 2024

(51) Int. Cl.
  *B62D 5/00* (2006.01)
  *B62D 1/16* (2006.01)
  *F16C 19/18* (2006.01)

(52) U.S. Cl.
  CPC ............... *B62D 5/001* (2013.01); *B62D 1/16* (2013.01); *F16C 19/181* (2013.01); *F16C 2326/24* (2013.01)

(58) Field of Classification Search
  CPC ...... F16C 2326/24; F16C 19/181; B62D 1/16; B62D 5/00; B62D 5/001
  See application file for complete search history.

(56) References Cited

U.S. PATENT DOCUMENTS

| | | | | |
|---|---|---|---|---|
| 610,961 | A | * 9/1898 | Davies et al. | F16C 25/06 56/6 |
| 1,219,921 | A | * 3/1917 | Collins, Jr. | F16C 23/084 384/609 |
| 1,433,014 | A | * 10/1922 | Kennedy | F16C 19/181 384/461 |

(Continued)

FOREIGN PATENT DOCUMENTS

| CN | 102425598 A | * 4/2012 | ............ F16C 19/181 |
|---|---|---|---|
| CN | 105387076 A | 3/2016 | |

(Continued)

OTHER PUBLICATIONS

JP2012144108A machine translation from espacenet.com (Year: 2024).*

(Continued)

*Primary Examiner* — Paul N Dickson
*Assistant Examiner* — Maxwell L Meshaka
(74) *Attorney, Agent, or Firm* — Harvest IP Law, LLP (57) ABSTRACT

According to the embodiments of the present invention, the range of control for the frictional force on a steering shaft is increased, the frictional force can be sustained at a set level to enhance the steering feel, the number of parts is reduced to improve ease of assembly and reduce cost of production, and deformation of the steering shaft can be minimized.

20 Claims, 11 Drawing Sheets

(56) References Cited

U.S. PATENT DOCUMENTS

| | | | | |
|---|---|---|---|---|
| 3,030,158 | A | * | 4/1962 | Pohler .................... F16C 41/02 384/615 |
| 6,513,984 | B1 | * | 2/2003 | Hobaugh ................ B62D 1/16 384/537 |
| 7,637,667 | B1 | * | 12/2009 | Schaub ................ F16C 27/066 384/536 |
| 8,118,328 | B2 | * | 2/2012 | Uchihara ................ B62D 1/20 180/444 |
| 9,045,941 | B2 | * | 6/2015 | Chustz .................... E21B 7/00 |
| 10,145,413 | B2 | * | 12/2018 | Okamoto ............ F16C 19/225 |
| 11,643,130 | B2 | * | 5/2023 | Shiroishi ................ B62D 1/18 74/493 |
| 11,772,701 | B2 | * | 10/2023 | Jordan .................... G05G 5/04 74/527 |
| 11,866,103 | B2 | * | 1/2024 | Büker .................... G05G 5/04 |
| 2002/0189888 | A1 | | 12/2002 | Magnus |
| 2003/0021507 | A1 | * | 1/2003 | Hobaugh, II ......... F16C 35/067 384/537 |
| 2010/0108430 | A1 | * | 5/2010 | Uchihara ................ B62D 1/16 180/400 |
| 2011/0303480 | A1 | | 12/2011 | Shimizu |
| 2014/0116780 | A1 | * | 5/2014 | Chustz .................... E21B 7/00 175/57 |
| 2018/0031034 | A1 | * | 2/2018 | Okamoto ............ F16C 19/305 |
| 2019/0178291 | A1 | * | 6/2019 | Matsunaga ............ F16C 33/583 |
| 2020/0164910 | A1 | * | 5/2020 | Shiroishi ................ F16C 17/02 |
| 2022/0001913 | A1 | * | 1/2022 | Shiroishi ................ B62D 1/16 |
| 2022/0227413 | A1 | * | 7/2022 | Bergmann ........... H02K 49/043 |
| 2023/0015798 | A1 | * | 1/2023 | Kim ...................... B62D 6/008 |
| 2023/0109811 | A1 | * | 4/2023 | Jordan .................... B62D 5/005 701/41 |
| 2023/0132966 | A1 | * | 5/2023 | Jordan .................... B62D 5/001 74/527 |
| 2023/0135320 | A1 | * | 5/2023 | Jordan .................... B62D 5/001 74/495 |
| 2023/0141259 | A1 | * | 5/2023 | Büker .................... B62D 5/001 74/527 |

FOREIGN PATENT DOCUMENTS

| | | | | |
|---|---|---|---|---|
| CN | 108518413 | A | * | 9/2018 |
| CN | 112283242 | A | * | 1/2021 ......... B60B 27/0005 |
| DE | 102016211556 | A1 | * | 12/2017 |
| DE | 102016221078 | A1 | * | 4/2018 .............. B62D 1/16 |
| DE | 102020210667 | A1 | * | 3/2021 .............. F16C 19/08 |
| EP | 0739807 | A2 | * | 10/1996 |
| JP | 2002-346807 | A | | 12/2002 |
| JP | 2007186014 | A | | 7/2007 |
| JP | 2012091677 | A | | 5/2012 |
| JP | 2012-144108 | A | | 8/2012 |
| JP | 2014-40210 | A | | 3/2014 |
| JP | 2017124714 | A | | 7/2017 |
| JP | 2017128250 | A | * | 7/2017 ............. B62D 5/006 |
| KR | 20010095519 | A | | 11/2001 |

OTHER PUBLICATIONS

JP2007186014A machine translation from espacenet.com (Year: 2024).*

Office Action issued in Chinese Patent Application No. 202080073706.4 dated Dec. 13, 2023.

* cited by examiner

STEER-BY-WIRE STEERING APPARATUS

CROSS REFERENCE TO RELATED APPLICATIONS

This application is a National Stage of International Application No. PCT/KR2020/014437 filed on Oct. 21, 2020, claiming priority to Korean Patent Application No. 10-2019-0137576 filed on Oct. 31, 2019, the disclosures of which is incorporated herein by reference in its entirety.

TECHNICAL FIELD

The present embodiments relate to a steer-by-wire steering device and, more specifically, to a steer-by-wire steering device capable of imparting a better steering feeling to the driver by increasing the range of adjusting friction on the steering shaft and keeping the adjusted friction constant, saving components to enhance assemblability and save costs, and preventing deformation of the steering shaft.

BACKGROUND ART

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

Due to lack of mechanical linkage between the steering shaft and the wheels, steer-by-wire steering devices do not directly convey the sensation of weight, coming from wheel friction against the road or being stuck, to the driver and thus require that the user's steering feel be increased by arbitrarily exerting a reaction force to the steering shaft.

Conventional steer-by-wire steering devices create friction by radially pressurizing the steering shaft with yokes and springs. Due to the limited stiffness of the spring, the maximum friction applied to the steering shaft is low and, as friction increases, it is difficult to apply a constant frictional force. Further, the presence of many components results in a hardship in assembly and disadvantages in view of costs. Moreover, as the yoke is supported only on one side of the steering shaft, the steering shaft may be deformed over time due to the elastic force of the spring.

DETAILED DESCRIPTION OF THE INVENTION

Technical Problem

The present embodiments have been conceived in the foregoing background and may provide a steer-by-wire steering device capable of imparting a better steering feeling to the driver by increasing the range of adjusting friction on the steering shaft and keeping the adjusted friction constant, saving components to enhance assemblability and save costs, and preventing deformation of the steering shaft.

Technical Solution

According to the present embodiments, there may be provided a steer-by-wire steering device, comprising a housing receiving a steering shaft and having a first step formed on an inner circumferential surface thereof as a diameter thereof is reduced, a first bearing including a first outer ring having a first axial side surface supported on the first step and a first inner ring coupled to an outer circumferential surface of the steering shaft, and a first coupling member coupled to the outer circumferential surface of the steering shaft to pressurize the second axial side surface of the first inner ring.

Further, according to the present embodiments, there may be provided a steer-by-wire steering device, comprising a housing receiving a steering shaft having a first step formed on an outer circumferential surface thereof as a diameter thereof is increased, a first bearing including a first inner ring having a first axial side surface supported on the first step and a first outer ring coupled to an inner circumferential surface of the housing, and a first coupling member coupled to the inner circumferential surface of the housing to pressurize the second axial side surface of the first outer ring.

Advantageous Effects

According to the present embodiments, it is possible to impart a better steering feeling to the driver by increasing the range of adjusting friction on the steering shaft and keeping the adjusted friction constant while saving components to enhance assemblability and save costs, and preventing deformation of the steering shaft.

MODE FOR CARRYING OUT THE INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
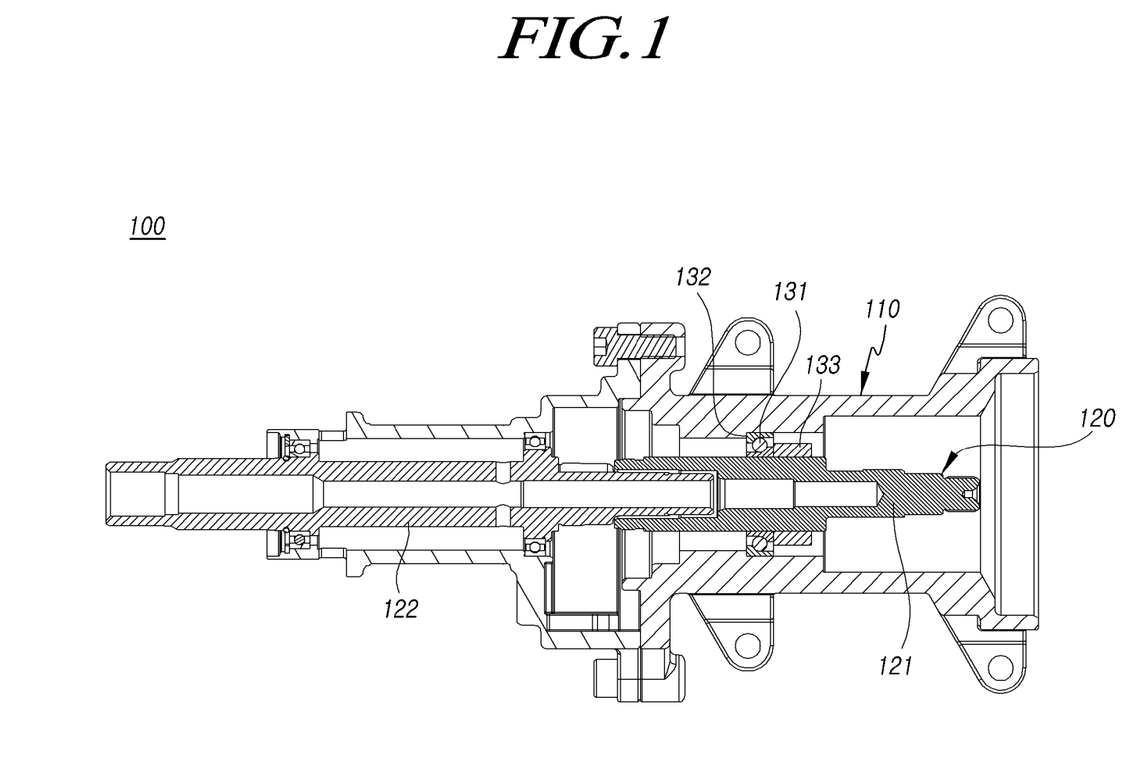
FIG. 1 is a cross-sectional view illustrating a steer-by-wire steering device according to the present embodiments.

FIG. 1 is a cross-sectional view illustrating a steer-by-wire steering device according to the present embodiments. FIGS. 2 to 6 are cross-sectional views illustrating a steer-by-wire steering device according to the present embodiments. FIGS. 7 to 11 are cross-sectional views illustrating a steer-by-wire steering device according to the present embodiments.

Referring to FIG. 1, the steer-by-wire steering device 100 according to the present embodiments includes a steering shaft 120 and a housing 110 receiving the steering shaft 120 and, as is described below in detail, increases the driver's steering feeling by applying pre-load to a first bearing 131 and a second bearing 511, coupled between the steering shaft 120 and the housing 110 to support rotation of the steering shaft 120, to generate friction.

Although it is shown in the drawings that the first bearing 131 and the second bearing 511 are coupled to the lower column 121 of the steering shaft 120, this is exemplary. Although the first bearing 131 and the second bearing 511 are coupled to the upper column 122, it is possible to generate friction by applying pre-load.

Further, for convenience of description and understanding, one axial side refers to the left side on the drawings, and the other axial side refers to the right side on the drawings. However, although in the drawings, the one axial side is a direction to the steering wheel, and the other axial side is the opposite direction, vice versa is also possible without limited thereto.

A description is made below with reference to FIGS. 2 to 6.

A steer-by-wire steering device 100 according to the present embodiments includes a housing 110 receiving a steering shaft 120 and having a first step 132 formed on an inner circumferential surface thereof as a diameter thereof is reduced, a first bearing 131 including a first outer ring 211 having a first axial side surface supported on the first step 132 and a first inner ring 212 coupled to an outer circumferential surface of the steering shaft 120, and a first coupling member 133 coupled to the outer circumferential surface of the steering shaft 120 to pressurize the second axial side surface of the first inner ring 212.

Figure 2:
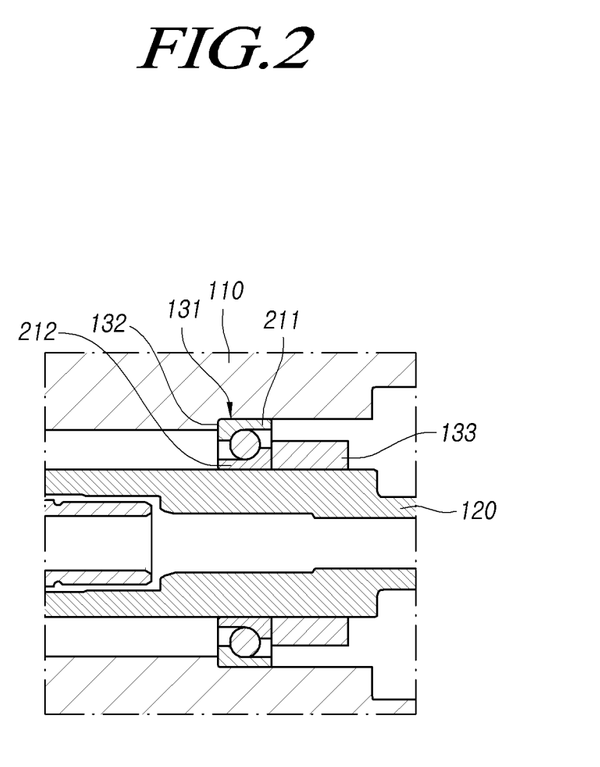
FIGS. 2 to 6 are cross-sectional views illustrating a steer-by-wire steering device according to the present embodiments.

Referring to FIG. 2, the first bearing 131 is coupled between the inner circumferential surface of the housing 110 and the outer circumferential surface of the steering shaft 120 to support rotation of the steering shaft 120. The first step 132 is formed on the inner circumferential surface of the housing 110 as the diameter is decreased, and the first coupling member 133 is coupled to the outer circumferential surface of the steering shaft 120 so that the first bearing 131 is axially fixed between the first step 132 and the first coupling member 133.

In other words, the first bearing 131 is axially inserted on the inner circumferential surface of the housing 110 so that the first outer ring 211 is axially supported on the first step 132, and the first coupling member 133 coupled to the outer circumferential surface of the steering shaft 120 is axially supported on the first inner ring 212 on the opposite side of the first step 132 to fix the first bearing 131.

The first coupling member 133 is press-fitted or screwed on the outer circumferential surface of the steering shaft 120. As the first coupling member 133 is fitted over the steering shaft 120 to axially pressurize the first inner ring 212, pre-load is applied to the first bearing 131, increasing friction caused inside the first bearing 131 during rotation and hence increasing the driver's steering feeling.

Further, the first bearing 131 may be an angular ball bearing. As shown in the drawings, as the first outer ring 211 is supported by the balls on the first axial side, and the first inner ring 212 is supported by the balls on the second axial side, and the first coupling member 133 axially pressurizes the first inner ring 212, friction on the contact surface between the balls and the first outer ring 211 and the contact surface between the balls and the first inner ring 212 increases.

Figure 3:
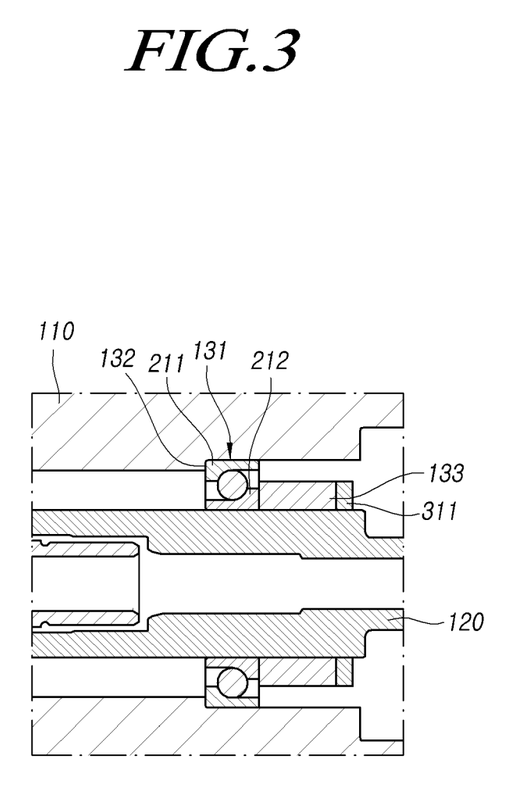

Further, referring to FIG. 3, a first anti-loosening member 311 supported by the first coupling member 133 on the second axial side is coupled to the outer circumferential surface of the steering shaft 120.

The first anti-loosening member 311 supports the first coupling member 133 in the direction to the first step 132 and prevents the coupling between the first coupling member 133 and the steering shaft 120 from loosening, maintaining the friction inside the first bearing 131 constant.

The first anti-loosening member 311 may be press-fitted and screwed to the steering shaft 120.

In a case where the first coupling member 133 and the first anti-loosening member 311 are screwed to the steering shaft 120, the first coupling member 133 is first screwed to the steering shaft 120 to pressurize the first bearing 131, and the first anti-loosening member 311 is then screwed to the steering shaft 120 to thereby prevent the first coupling member 133 from loosening. For example, the first coupling member 133 may be screwed by a tightening torque of 5 to 25 Nm, and the first anti-loosening member 311 may be screwed by a tightening torque of 48 to 69 Nm.

As such, by generating friction inside the first bearing 131 while screwing the first coupling member 133 and the first anti-loosening member 311 by a properly selected tightening torque, it is possible to increase the range of adjusting the frictional force applied to the steering shaft 120 and keep the adjusted frictional force constant.

Figure 4:
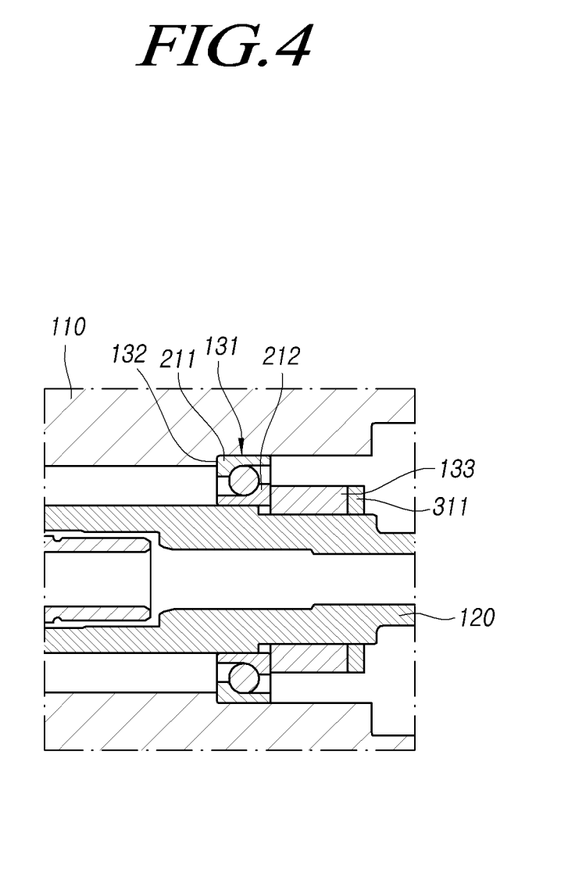

Further, referring to FIG. 4, the portion of the steering shaft 120, coupled with the first coupling member 133, may be formed to have a smaller outer diameter than the portion coupled with the first inner ring 212.

In other words, as the outer circumferential surface of the steering shaft 120 is stepped, the first inner ring 212 is coupled to the portion formed with a relatively large outer diameter, and the first coupling member 133 is coupled to the portion formed with a relatively small outer diameter.

For the first coupling member 133 to be coupled to pressurize the first inner ring 212, the first coupling member 133 should not be axially supported by the first outer ring 211. As the first coupling member 133 is coupled to the portion with a relatively small outer diameter, it may be prevented from being supported on the first outer ring 211. Further, although the first coupling member 133 has a larger radial thickness, it is not supported on the first outer ring 211, so that the first coupling member 133 may be screwed with high tightening torque.

Figure 5:
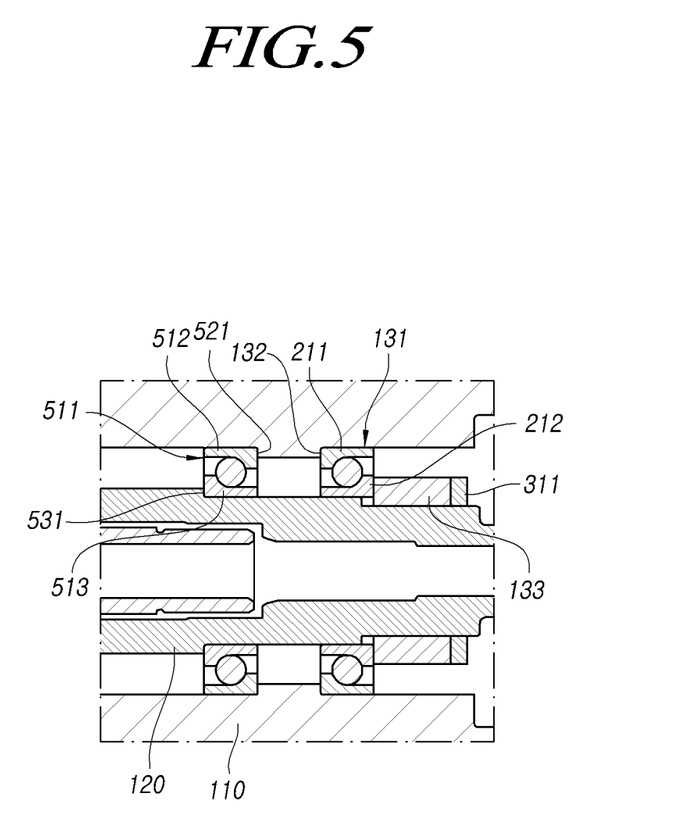
Figure 6:
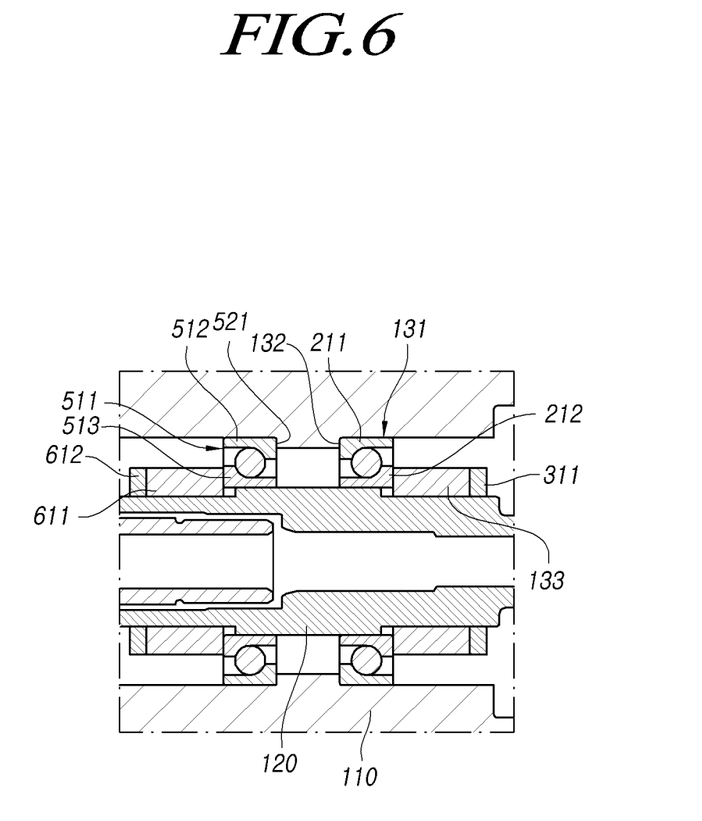

Referring to FIGS. 5 and 6, a second bearing 511 may further be provided between the steering shaft 120 and the housing 110, supporting rotation of the steering shaft 120.

In other words, a second step 521 is formed on the inner circumferential surface of the housing 110 as the diameter is increased on the second axial side of the first step 132 (in other words, a diameter-reduced portion is formed on the inner circumferential surface of the housing 110, and the first step 132 and the second step 521 are provided on two opposite sides of the diameter-reduced portion), and the second bearing 511 includes a second outer ring 512 coupled to the inner circumferential surface of the housing and having the second axial side supported on the second step 521 and a second inner ring 513 coupled to the outer circumferential surface of the steering shaft 120.

The second bearing 511 is positioned on the first axial side of the first bearing 131. As described below, as is done on the first bearing 131, pre-load is applied to the second bearing 511 to create friction, thereby increasing the driver's steering feeling.

As the second bearing 511 is further provided, the friction caused inside the bearings and the pre-load applied to each bearing may be distributed to increase the driver's steering feeling, thus rendering it possible to prevent damage to the balls and minimize debris due to wear.

Similarly, the second bearing 511 may be an angular ball bearing. As shown in the drawings, the second outer ring 512 is supported by the balls on the second axial side, and the second inner ring 513 is supported by the balls on the first axial side.

In other words, the first bearing 131 and the second bearing 511 are back-to-back coupled to each other.

Referring to FIG. 5, a third step 531 supported on the first axial side surface of the second inner ring 513 is formed on the outer circumferential surface of the steering shaft 120 as the diameter is increased, and the second bearing 511 is axially fixed between the second step 521 and the third step 531.

Accordingly, as the first coupling member 133 is coupled to the steering shaft 120 while pressurizing the first inner ring 212, pre-load is applied to the second bearing 511 as well, so that the driver's steering feeling may be increased by the friction caused inside the first bearing 131 and the second bearing 511.

Referring to FIG. 6, a second coupling member 611 to pressurize the first axial side of the second inner ring 513 is coupled to the outer circumferential surface of the steering shaft 120, so that the driver's steering feeling may be increased by the friction caused inside the first bearing 131 by the first coupling member 133 and the friction caused inside the second bearing 511 by the second coupling member 611.

Further, as a second anti-loosening member 612 supported on the second coupling member 611 in the direction to the second step 521 is coupled to the outer circumferential surface of the steering shaft 120, the second coupling member 611 may be prevented from loosening.

Likewise, the second coupling member 611 and the second anti-loosening member 612 may be press-fitted or screwed to the steering shaft 120, and details thereof are the same as those of the first coupling member 133 and the second anti-loosening member 612 and are thus omitted from description.

Further, the portion of the steering shaft 120, coupled with the second coupling member 611, may be formed to have a smaller outer diameter than the portion coupled with the second inner ring 513.

Accordingly, it may be possible to prevent the second coupling member 611 from being axially supported on the second outer ring 512, and screwing is possible with higher tightening torque.

Referring to FIGS. 7 to 11, the same components as those in the above-described embodiments are denoted by the same reference numbers, and common features are briefly described.

A steer-by-wire steering device 100 according to the present embodiments includes a housing 110 receiving a steering shaft 120 having a first step 711 formed on an outer circumferential surface thereof as the diameter is increased, a first bearing 131 including a first inner ring 212 having a first axial side surface supported on the first step 711 and a first outer ring 211 coupled to the inner circumferential surface of the housing 110 and a first coupling member 133 coupled to the inner circumferential surface of the housing 110 to pressurize a second axial side surface of the first outer ring 211.

Figure 7:
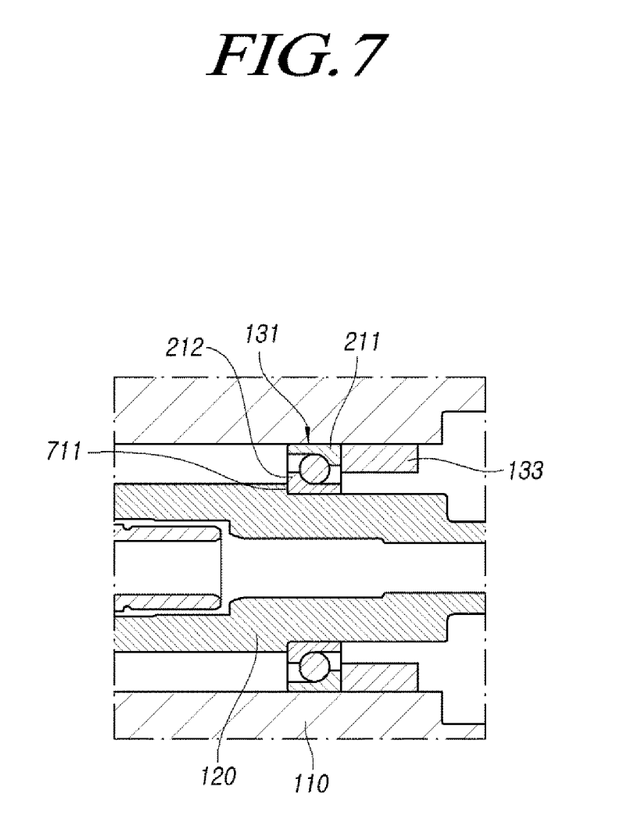
FIGS. 7 to 11 are cross-sectional views illustrating a steer-by-wire steering device according to the present embodiments.

Referring to FIG. 7, the first step 711 is formed on the outer circumferential surface of the steering shaft 120 as the diameter is increased, and the first coupling member 133 is coupled to the inner circumferential surface of the housing 110 so that the first bearing 131 is axially fixed between the first step 711 and the first coupling member 133 and supports rotation of the steering shaft 120.

Further, the first bearing 131 may be an angular ball bearing. As shown in the drawings, the first inner ring 212 is supported by the balls on the first axial side, and the first outer ring 211 is supported by the balls on the second axial side so that the first coupling member 133 axially pressurizes the first outer ring 211, causing friction inside the first bearing 131 and hence increasing the driver's steering feeling.

Figure 8:
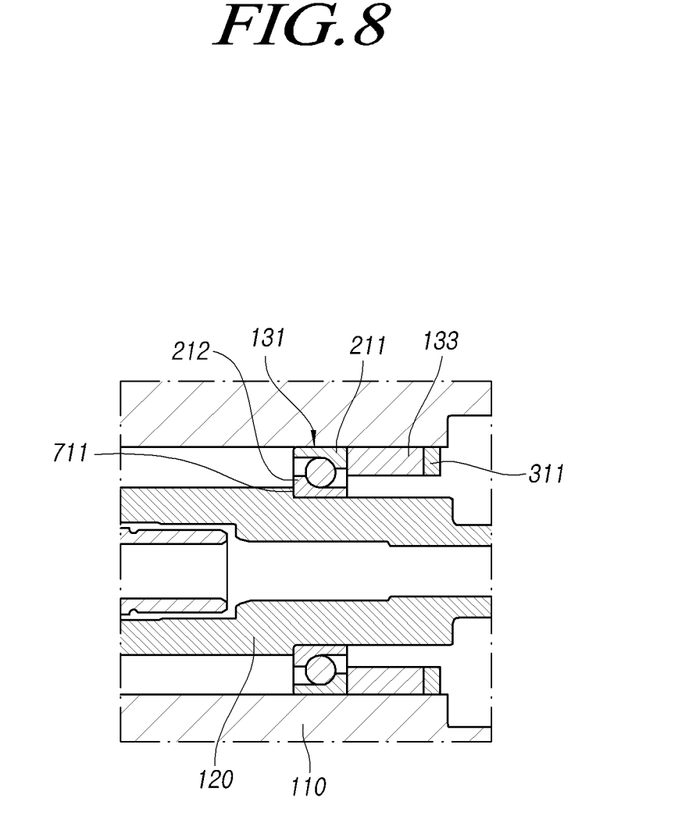

Referring to FIG. 8, a first anti-loosening member 311 supported by the first coupling member 133 on the second axial side is coupled to the inner circumferential surface of the housing 110, preventing the coupling between the first coupling member 133 and the steering shaft 120 from loosening and keeping the friction caused inside the first bearing 131 constant.

The first coupling member 133 and the first anti-loosening member 311 may be press-fitted or screwed to the housing 110 and, as appropriate tightening torque is selected, it is possible to increase the range of adjusting the frictional force applied to the steering shaft 120 and keep the frictional force constant.

Figure 9:
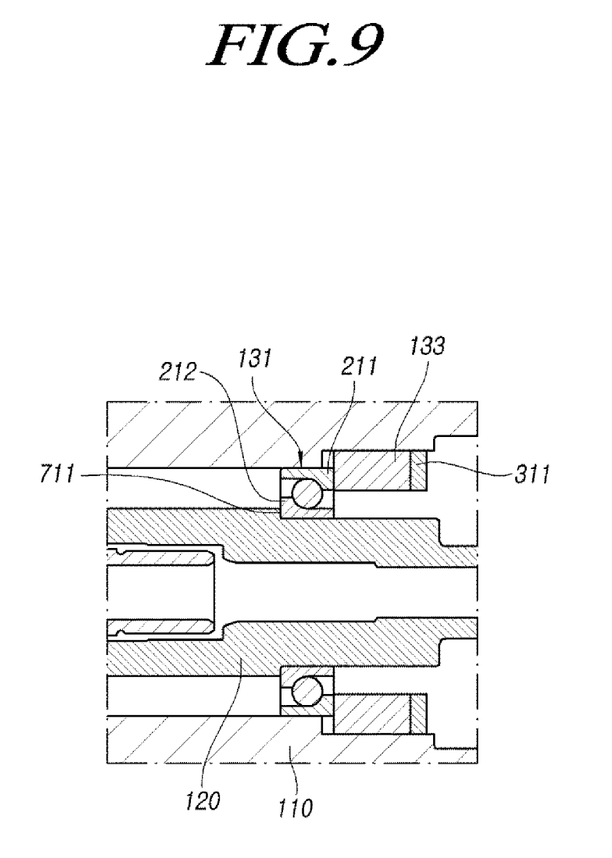

Further, referring to FIG. 9, the portion of the housing 110, coupled with the first coupling member 133, may be formed to have a larger inner diameter than the portion coupled with the first outer ring 211.

Accordingly, it may be possible to prevent the first coupling member 133 from being axially supported on the first outer ring 212, and screwing is possible with higher tightening torque.

Figure 10:
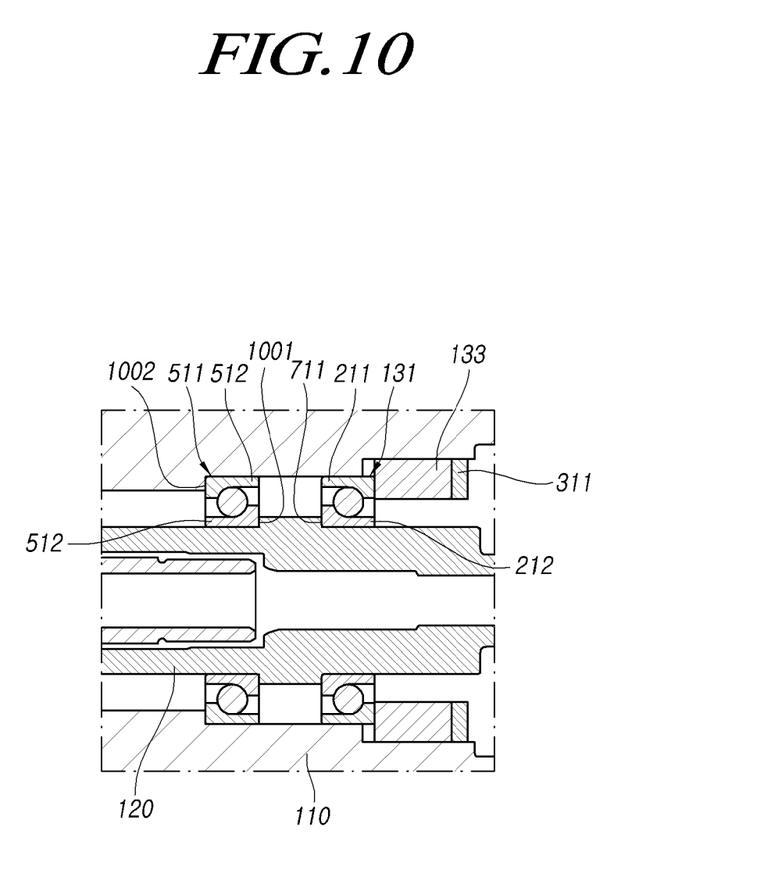
Figure 11:
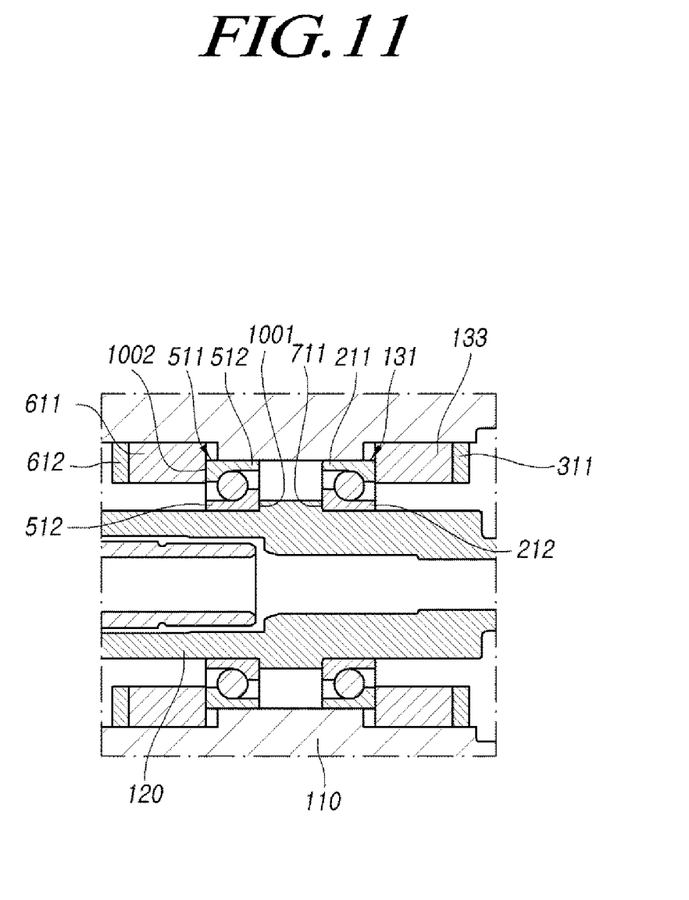

Referring to FIGS. 10 and 11, a second bearing 511 may further be provided between the steering shaft 120 and the housing 110, supporting rotation of the steering shaft 120.

In other words, a second step 1001 is formed on the outer circumferential surface of the steering shaft 120, on the second axial side of the first step 711, as the diameter is decreased, and the second bearing 511 is coupled to the outer circumferential surface of the steering shaft 120 and includes a second inner ring 513 having the second axial side surface supported on the second step 1001 and a second outer ring 512 coupled to the inner circumferential surface of the housing 110.

The second bearing 511 is positioned on the first axial side of the first bearing 131. By applying pre-load to the second bearing 511 to create friction, it is possible to distribute the friction and pre-load for increasing the driver's steering feeling, thereby preventing damage to the balls and minimizing debris due to wear.

Similarly, the second bearing 511 may be an angular ball bearing. As shown in the drawings, the second inner ring 513 is supported by the balls on the second axial side, and the second outer ring 512 is supported by the balls on the first axial side.

In other words, the first bearing 131 and the second bearing 511 are face-to-face coupled to each other.

Referring to FIG. 10, a third step 1002 supported on the first axial side surface of the second outer ring 512 is formed on the inner circumferential surface of the housing 110 as the diameter is decreased, and the second bearing 511 is axially fixed between the second step 1001 and the third step 1002.

Accordingly, as the first coupling member 133 is coupled to the housing 110 while pressurizing the first outer ring 211, pre-load is applied to the second bearing 511 as well, so that the driver's steering feeling may be increased by the friction caused inside the first bearing 131 and the second bearing 511.

Referring to FIG. 11, a second coupling member 611 to pressurize the first axial side surface of the second outer ring 512 is coupled to the inner circumferential surface of the housing 110, so that the driver's steering feeling may be increased by the friction caused inside the first bearing 131 and the second bearing 511 by the first coupling member 133 and the second coupling member 611, respectively.

Further, a second anti-loosening member 612 supported by the second coupling member 611 on the first axial side is coupled to the inner circumferential surface of the housing 110, preventing the second coupling member 611 from loosening.

Similarly, the second coupling member 611 and the second anti-loosening member 612 may be press-fitted or screwed to the housing 110.

Further, the portion of the housing 110, coupled with the second coupling member 611, is formed to have a larger inner diameter than the portion coupled with the second outer ring 512, so that the second coupling member 611 may be prevented from being axially supported on the second inner ring 513 and be screwed with higher tightening torque.

By the so-shaped steer-by-wire steering device, it is possible to impart a better steering feeling to the driver by increasing the range of adjusting friction on the steering shaft and keeping the adjusted friction constant while saving components to enhance assemblability and save costs, and preventing deformation of the steering shaft.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This application claims priority to Korean Patent Application No. 10-2019-0137576 filed in the Korean Intellectual Property Office on Oct. 31, 2019, the disclosure of which is incorporated by reference herein in its entirety.

The invention claimed is:

1. A steer-by-wire steering device, comprising:
  a housing receiving a steering shaft and having a first step formed on an inner circumferential surface thereof as a diameter thereof is reduced toward one axial direction such that the first step has a first step surface perpendicular to the one axial direction and facing an opposite axial direction;
  a first bearing including a first outer ring and a first inner ring, the first outer ring having a one-axial-direction side surface supported by the first step surface and the first inner ring coupled to an outer circumferential surface of the steering shaft; and
  a first coupling member coupled to the outer circumferential surface of the steering shaft and supporting an opposite-axial-direction side surface of the first inner ring,
  wherein the first step surface of the housing supports the one-axial-direction side surface of the first outer ring toward the opposite axial direction and the first coupling member supports the opposite-axial-direction side surface of the first inner ring toward the one axial direction.

2. The steer-by-wire steering device of claim 1, wherein the first bearing is an angular ball bearing.

3. The steer-by-wire steering device of claim 1, wherein a first anti-loosening member is coupled to the outer circumferential surface of the steering shaft and supports an opposite-axial-direction side surface of the first coupling member toward the one axial direction.

4. The steer-by-wire steering device of claim 1, wherein a portion of the steering shaft, coupled with the first coupling member, is formed to have a smaller outer diameter than a portion coupled with the first inner ring.

5. The steer-by-wire steering device of claim 1, wherein a second step is formed on the inner circumferential surface of the housing as the diameter is increased toward the opposite axial direction, such that the second step has a second step surface perpendicular to the one axial direction and facing the one axial direction, and
   wherein a second bearing is provided with a second outer ring and a second inner ring, the second outer ring coupled to the inner circumferential surface of the housing and having an opposite-axial-direction side surface supported by the second step surface and the second inner ring coupled to the outer circumferential surface of the steering shaft,
   wherein the second step surface supports the opposite-axial-direction side surface of the second outer ring toward the one axial direction.

6. The steer-by-wire steering device of claim 5, wherein the second bearing is an angular ball bearing.

7. The steer-by-wire steering device of claim 5, wherein a third step is formed on the outer circumferential surface of the steering shaft as the steering shaft's diameter is increased toward the one axial direction such that the third step has a third step surface perpendicular to the one axial direction and facing the opposite axial direction,
   wherein the third step surface supports a one-axial-direction side surface of the second inner ring toward the opposite axial direction.

8. The steer-by-wire steering device of claim 5, wherein a second coupling member is coupled to the outer circumferential surface of the steering shaft and supports a one-axial-direction side surface of the second inner ring toward the opposite axial direction.

9. The steer-by-wire steering device of claim 8, wherein a second anti-loosening member is coupled to the outer circumferential surface of the steering shaft and supports the second coupling member toward the opposite axial direction.

10. The steer-by-wire steering device of claim 8, wherein a portion of the steering shaft, coupled with the second coupling member, is formed to have a smaller outer diameter than a portion coupled with the second inner ring.

11. A steer-by-wire steering device, comprising:
   a housing receiving a steering shaft having a first step formed on an outer circumferential surface thereof as a diameter thereof is increased toward one axial direction such that the first step has a first step surface perpendicular to the one axial direction and facing an opposite axial direction;
   a first bearing including a first inner ring and a first outer ring, the first inner ring having a one-axial-direction side surface supported by the first step surface and the first outer ring coupled to an inner circumferential surface of the housing; and
   a first coupling member coupled to the inner circumferential surface of the housing and supporting an opposite-axial-direction side surface of the first outer ring,
   wherein the first step surface of the steering shaft supports the one-axial-direction side surface of the first inner ring toward the opposite axial direction and the first coupling member, which has an axial width larger than a radial width, fixedly supports the opposite-axial-direction side surface of the first outer ring toward the one axial direction.

12. The steer-by-wire steering device of claim 11, wherein the first bearing is an angular ball bearing.

13. The steer-by-wire steering device of claim 11, wherein a first anti-loosening member is coupled to the inner circumferential surface of the housing and supports an opposite-axial-direction side surface of the first coupling member toward the one axial direction.

14. The steer-by-wire steering device of claim 11, wherein a portion of the housing, coupled with the first coupling member, is formed to have a larger inner diameter than a portion coupled with the first outer ring.

15. The steer-by-wire steering device of claim 11, wherein a second step is formed on the outer circumferential surface of the steering shaft as the diameter is increased toward the opposite axial direction, such that the second step has a second step surface perpendicular to the one axial direction and facing the one axial direction, and
   wherein a second bearing is provided with a second inner ring and a second outer ring, the second inner ring coupled to the outer circumferential surface of the steering shaft and having an opposite-axial-direction side surface supported by the second step surface and the second outer ring coupled to the inner circumferential surface of the housing,
   wherein the second step surface supports the opposite-axial-direction side surface of the second inner ring toward the one axial direction.

16. The steer-by-wire steering device of claim 15, wherein the second bearing is an angular ball bearing.

17. The steer-by-wire steering device of claim 15, wherein a third step is formed on the inner circumferential surface of the housing as the housing's diameter is decreased toward the one axial direction such that the third step has a third step surface perpendicular to the one axial direction and facing the opposite axial direction,
   wherein the third step surface supports a one-axial-direction side surface of the second outer ring toward the opposite axial direction.

18. The steer-by-wire steering device of claim 15, wherein a second coupling member is coupled to the inner circumferential surface of the housing and supports a one-axial-direction side surface of the second outer ring toward the opposite axial direction.

19. The steer-by-wire steering device of claim 18, wherein a second anti-loosening member is coupled to the inner circumferential surface of the housing and supports the second coupling member toward the opposite axial direction.

20. The steer-by-wire steering device of claim 18, wherein a portion of the housing, coupled with the second coupling member, is formed to have a larger inner diameter than a portion coupled with the second outer ring.

* * * * *